United States Patent
Greenwood et al.

(10) Patent No.: US 10,353,634 B1
(45) Date of Patent: Jul. 16, 2019

(54) STORAGE TIER-BASED VOLUME PLACEMENT

(71) Applicant: Amazon Technologies, Inc., Reno, NV (US)

(72) Inventors: Christopher Magee Greenwood, Seattle, WA (US); Gary Michael Herndon, Jr., Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 293 days.

(21) Appl. No.: 15/082,610

(22) Filed: Mar. 28, 2016

(51) Int. Cl.
*G06F 3/06* (2006.01)

(52) U.S. Cl.
CPC .......... *G06F 3/0665* (2013.01); *G06F 3/061* (2013.01); *G06F 3/0619* (2013.01); *G06F 3/0689* (2013.01)

(58) Field of Classification Search
CPC ........ G06F 3/06–3/0689; G06F 11/203; G06F 17/30221
See application file for complete search history.

(56) References Cited

U.S. PATENT DOCUMENTS

| | | | |
|---|---|---|---|
| 6,816,941 B1 * | 11/2004 | Carlson | G06F 3/0607 711/111 |
| 2008/0126673 A1 * | 5/2008 | Kaneda | G06F 3/0605 711/103 |
| 2012/0047346 A1 * | 2/2012 | Kawaguchi | G06F 3/0605 711/165 |
| 2012/0117322 A1 * | 5/2012 | Satran | G06F 3/0625 711/114 |
| 2013/0036266 A1 * | 2/2013 | Naganuma | G06F 3/061 711/114 |
| 2013/0036286 A1 * | 2/2013 | Jin | G06F 3/0605 711/170 |
| 2013/0073702 A1 * | 3/2013 | Umbehocker | G06F 9/5016 709/222 |

* cited by examiner

*Primary Examiner* — Nicholas J Simonetti
(74) *Attorney, Agent, or Firm* — Hogan Lovells US, LLP

(57) ABSTRACT

Data volumes for a customer can be placed on various storage tiers, including different hardware types or storage systems, that are determined to be appropriate for the anticipated usage of those data volumes. The actual usage can be monitored to determine one or more types of workload for the data volume, and a determination made as to whether all, or portions, of the data volume could obtain a significant performance improvement by being migrated to a different storage tier. In some instances the chunks or partitions of a volume can be concurrently distributed across multiple different storage tiers in order to satisfy various performance and/or cost criteria. Once workload information is available for a customer, that information can be used to determine the storage tiers for initial placement of subsequent data volumes.

18 Claims, 10 Drawing Sheets

STORAGE TIER-BASED VOLUME PLACEMENT

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. Multiple users can share resources such as remote servers and data repositories, wherein the users can concurrently send multiple requests to be executed against the same resource. The resources can be physical resources or virtual resources provided through virtualization. In many instances, data volumes for a customer will be placed on resources that have sufficient available capacity. In many instances the data volumes will be placed on a specific type of hardware. Different users access and utilize their data differently, and different types of hardware are optimal for different uses. In many instances the type of hardware utilized will depend upon the type of data volume obtained and not on the actual usage by the user, which can result in inefficiencies and excess cost to both the user and the provider.

BRIEF DESCRIPTION OF THE DRAWINGS

Various embodiments in accordance with the present disclosure will be described with reference to the drawings, in which.

DETAILED DESCRIPTION

Figure 1:
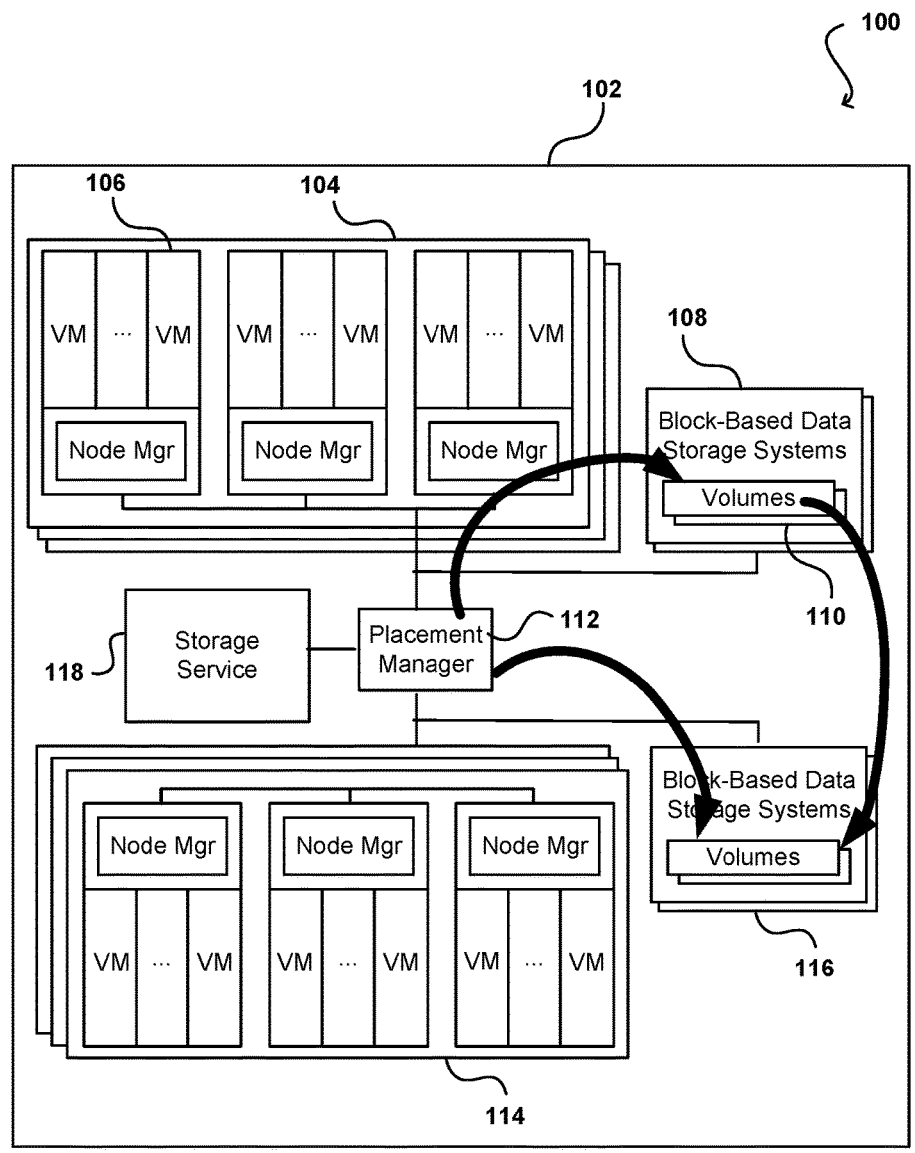
FIG. 1 illustrates an example approach to placing and/or migrating data volumes that can be utilized in accordance with various embodiments.

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for the placement and movement of data volumes, and other such resource allocations, based at least in part upon the types of volumes available and an observed and/or prediction usage pattern for the corresponding customer.

In some embodiments, data volumes can be created on specific storage tiers that are selected specifically to be of adequate performance for most data volumes. Storage tiers can include, for example, types of storage hardware, such as magnetic (e.g., disk or tape) or solid state drive (SSD) storage, and/or types of storage systems, such as in-memory (local) storage, block storage, object storage, archival storage, or general cloud storage systems which may each have different system or network architectures. In other embodiments, a customer might select an initial storage tier or past customer behavior might be used to select the initial storage tier, among other such options. Once the data volume begins accepting I/O requests, for example, the usage of that data volume can be monitored and analyzed to attempt to determine patterns in the usage, or other such metrics, that can be used to determine a type of workload for the data volume. Once a type of workload is determined with sufficient confidence, the data volume can be migrated to a different storage tier that is optimized for that type of workload. This can include, for example, going from magnetic storage to solid state storage, or going from a block storage service to a general cloud storage service, among other such options. The data volume can be moved as appropriate over the lifetime of the data volume in order to optimize performance as well as to adapt to changes in the usage of the data volume. In at least some embodiments migrations can only occur after a minimum amount of time has passed since the last placement or migration of the data volume, in order to prevent frequent movement of the data volume due to minor variations in usage. In some embodiments, at least a minimum level of improvement in performance, or reduction in cost, must be predicted or calculated before a data volume can be migrated, among other such options.

Further, approaches in accordance with various embodiments can allow different portions of a data volume to reside on different storage tiers. For example, different chunks or partitions can reside on different storage tiers optimized for different types of workloads. Individual partitions or chunks can then be moved to different storage tiers as the workloads change, or new chunks or partitions for a volume can be added to different storage tiers, among other such options. In some embodiments, the migration might balance performance and cost, with a customer indicating to maximize performance under a given cost cap or minimize cost while meeting certain performance criteria, among other such options.

Various other applications, processes, and uses are presented below with respect to the various embodiments.

FIG. 1 illustrates an example network configuration 100 in which data can be stored, and operations performed, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s).

As illustrated, there is a first set of resources 104, 108 in a first location and a second set of resources 114, 116 in a second location (different logically and/or geographically from the first location). These resources can be of the same or different types. Resources have limited capacity, and if the block-based storage systems 108 in one set are full, then additional volumes might have to be stored to block-based storage systems 116 of the other set. Accordingly, approaches in accordance with various embodiments attempt to place and/or relocate (i.e., migrate) data volumes where possible in order to improve performance, cost, and availability. This can include, for example, placing data volumes on a first set of resources and then later moving data volumes to a second set of resources, such as where the first and second set include different types of storage capacity. In some embodiments, data volumes that are detached from current virtual machines and have not been accessed for at least a determined period of time can potentially be snapshotted and moved to a separate storage service 118, for example, such as a Web-based persistent data storage service. The placement and movements can be determined and executed, at least in part, using a placement manager 112 or other such system or service.

In one example, a customer requesting to have a data storage volume allocated for use, as may receive input and/or output (I/O) instructions, will also have a virtual machine instance allocated that will be connected and/or attached to the instance. A volume placed on a server takes up various resources and/or capacity from the server, including bytes, slots, IOPS, and throughput, among others. The IOPS and throughput resources apply for that volume only when there is at least some volume of I/O. An example server might have a capacity of 10,000 IOPS and a volume placed on that server might be configured with 1,000 IOPS. The volume thus could perform up to 1,000 IOPS such that the IOPS need to be allocated on that server for the volume. This leaves only 9,000 remaining IOPS of capacity on the server. If the volume is not actually performing any I/O operations, however, this results in unused capacity as the server could still actually handle 10,000 IOPS. Approaches in various embodiments may not count detached volumes into the IOPS equation, and thus can consider that the server is capable of holding volumes up to 10,000 instead of 9,000 IOPS, which helps to minimize unused capacity, which improves performance and reduces cost. There is a risk to such an approach, however, as the detached volume could be connected and/or attached any time by the customer. If all the volumes on a server get connected and drive at their maximum I/O allocation, the server will not be able to cater to all the demand. To protect against this, various approaches can reserve at least some IOPS for detached volumes, which still results in some unused capacity.

Figure 2:
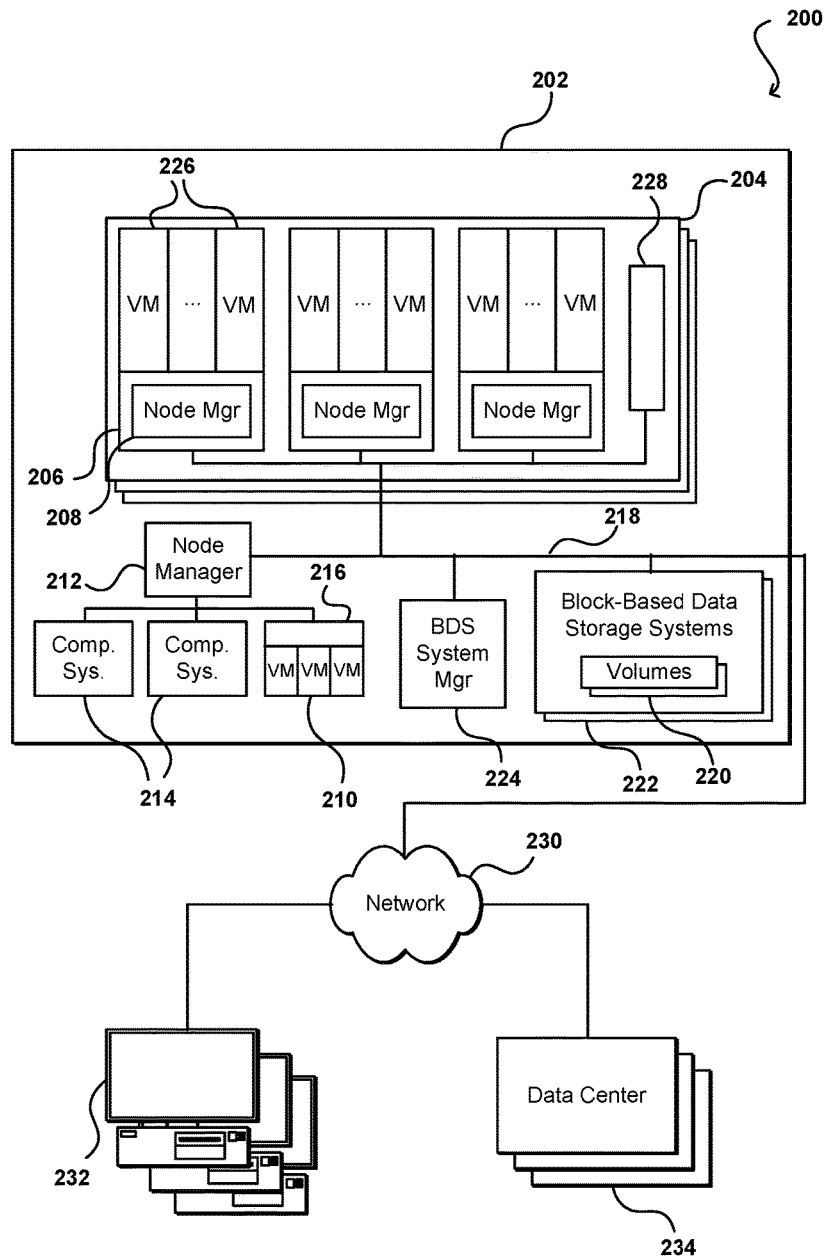
FIG. 2 illustrates an example environment in which aspects of the various embodiments can be implemented.

FIG. 2 illustrates an example network configuration 200 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 202 also includes a computing system 224 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 234, or other remote computing systems 232 external to the data center). In particular, in this example the data center 202 includes a pool of multiple block-based data storage systems 222, which each have local block-based storage for use in storing one or more volume copies 220. Access to the volume copies 220 is provided over the internal network(s)

218 to programs executing on various resource nodes 210 and 214. As discussed in greater detail elsewhere, a block-based data storage system manager module 224 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 222 may coordinate with the node manager modules 212, 208 to manage use of volumes by programs executing on associated resource nodes, while in other embodiments the node manager modules may not be used to manage such volume use. In addition, in other embodiments, one or more BDS system manager modules 224 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 222 (e.g., in a peer-to-peer manner, without any separate centralized BDS system manager module on a computing system 224).

In this example, the various host computing systems, server block data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
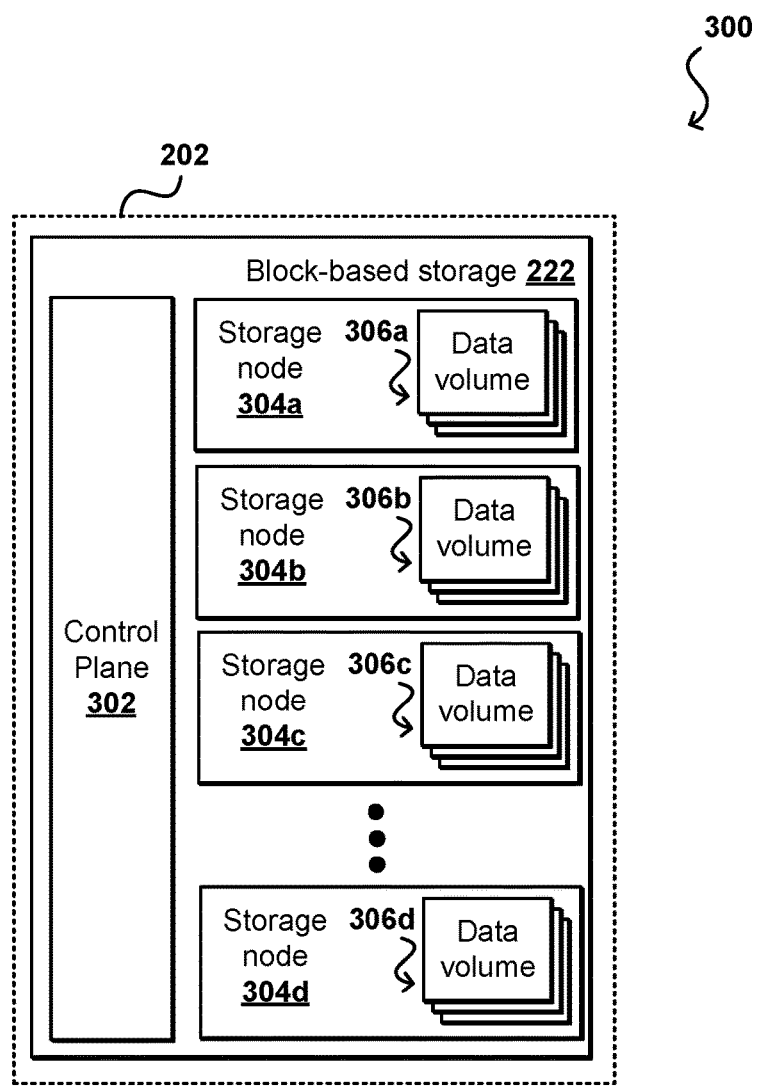
FIG. 3 illustrates components of an example block-based data storage service that can be utilized in accordance with various embodiments.

A block-based storage service provider can implement functionality such as page cache write logging and the dynamic modifying of durability properties for data volumes. FIG. 3 is a block diagram illustrating components of a provider environment 202 such as described with respect to FIG. 2. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, as may include a block-based storage service 222 in at least some embodiments. A provider environment 300, or other such multi-tenant or shared resource environment, may be set up by an entity such as a company or a public sector organization to provide one or more services (such as various types of cloud-based computing or storage) accessible via the Internet and/or other networks to clients. The provider environment 202 may include numerous data centers hosting various resource pools, such as collections of physical and/or virtualized computer servers, storage devices, networking equipment and the like, used to implement and distribute the infrastructure and services offered by the provider environment 202. In some embodiments, the provider environment 202 may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances, that make use of particular data volumes, providing virtual block storage for the compute instances.

In various embodiments, the provider environment 202 implements a block-based storage 222 system or service for performing storage operations. The example block-based storage 222 is a storage system, composed of a pool of multiple independent storage nodes 304a, 304b, 304c through 304n (e.g., server block data storage systems), which provide block level storage for storing one or more sets of data volumes 306a, 306b, 306c, through 306n. The data volumes 306 can be mapped to particular clients, providing virtual block-based storage (e.g., hard disk storage or other persistent storage) as a contiguous set of logical blocks. In some embodiments, a data volume 306 may be divided up into multiple data chunks (including one or more data blocks) for performing other block storage operations, such as snapshot operations or replication operations. A volume snapshot of a data volume 306 may be a fixed point-in-time representation of the state of the data volume. In some embodiments, volume snapshots may be stored remotely from a storage node 304 maintaining a data volume 306, such as in another storage service. Snapshot operations may be performed to send, copy, and/or otherwise preserve the snapshot of a given data volume in another storage location, such as a remote snapshot data store in another storage service.

A block-based storage service 222 can implement a block-based storage service control plane 302 to assist in the operation of the block-based storage service 222. In various embodiments, the block-based storage service control plane 302 assists in managing the availability of block data storage to clients, such as programs executing on compute instances provided by a virtual compute service and/or other network-based services located within the provider environment 202 and/or optionally computing systems (not shown) located within one or more other data centers, or other computing systems external to the provider network and available over at least one network. Access to the data volumes 306 may be provided over an internal network within the provider network 202 or externally via an appropriate network, in response to block data transaction instructions.

A block-based storage service control plane 302 can provide a variety of services related to providing block level storage functionality, including the management of user accounts (e.g., creation, deletion, billing, collection of payment, etc.). The block-based storage service control plane 302 may further provide services related to the creation, usage and deletion of data volumes 306 in response to configuration or other such requests. The block-based storage service control plane 302 can also provide services related to the creation, usage, and deletion of volume snapshots on another storage service. The block-based storage service control plane 302 may also provide services related to the collection and processing of performance and auditing data related to the use of data volumes 306 and snapshots of those volumes.

The provider environment 202 may also implement other storage services, as noted above. Another storage service may provide a same or different type of storage as provided by the block-based storage service 222. For example, in some embodiments another storage service may provide an object-based storage service, which may store and manage data as data objects. For example, volume snapshots of various data volumes 306 may be stored as snapshot objects for a particular data volume 306. In addition to another storage service, the provider environment 202 may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the network environment 202. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 306, or other network-based service in the provider environment 302 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 306 in a manner that is transparent to applications implemented on the client, utilizing computational resources provided by the compute instance or block storage provided by the data volume 306.

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 4:
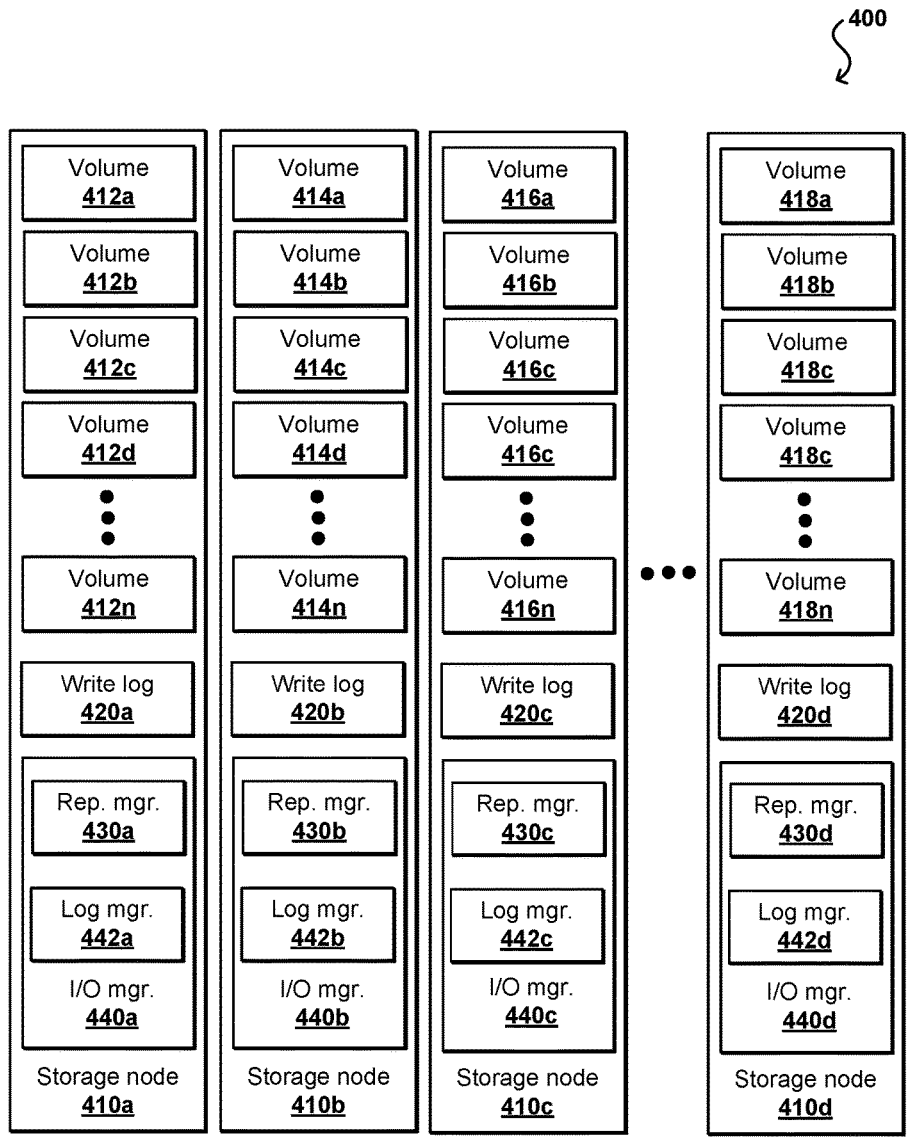
FIG. 4 illustrates a set of storage nodes that can be utilized in accordance with various embodiments.

FIG. 4 is a block diagram 400 illustrating storage nodes that implement write logs for updates to page caches implemented at the storage nodes and dynamically modifying durability properties for data volumes, according to some embodiments. Multiple storage nodes, such as storage nodes 410a, 410b, 410c, through 410n may be implemented in order to provide block-based storage services. A storage node 410 can comprise one or more computing systems or devices, such as a storage server or other such computing system or device. Each storage node 410 can maintain respective replicas of data volumes. For instance, a first storage node 410a maintains a set of data volumes 412, while storage nodes 410b through 410d maintain other data volumes 414, 416, 418, respectively. While the example storage nodes 410 are depicted as having equal numbers of data volumes, numbers of data volumes maintained on storage nodes may vary between storage nodes. Some data volumes may also differ in size from other data volumes, in some embodiments. In addition, some data volumes may be split, or partitioned, into different segments, such that multiple storage nodes, such as storage node 410a and 410b, store different segments of a storage volume. A storage volume may be partitioned into any number of segments. Storage nodes 410 can be used to provide multi-tenant storage. For example, in some embodiments a data volume 416a maintained at a storage node 410c may be maintained for one account of the block-based storage service, while a different data volume 416b also maintained at the same storage node 410c may be maintained for a different account. Storage nodes 410 can persist their respective data volumes in one or more block-based storage devices (e.g., hard disk drives, solid state drives, etc.) that may be directly attached to a computing system or device implementing the respective storage node.

In various embodiments, storage nodes 410 may each implement at least one respective page cache. A page cache can be a portion of system memory or other memory device that stores pages or other groupings of data from one of the data volumes 412 maintained a respective storage node 410. Instead of directly writing to or reading from a block-based storage device maintaining the portion of requested data of a data volume, the page cache may be updated. For example, if a read request is received for a portion of a data volume, it may first be determined whether the data resides in the page cache. If the data resides in the page cache then the data may be read from cache. If not, the data may be retrieved from the respective block-based storage device maintaining the portion of the requested data of the data volume and written into the page cache for future use. Similarly, a write request may be directed toward a data volume maintained in persistent block storage may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, the storage nodes 410 can implement respective write logs 420. Write logs, for example page cache write logs, may store log records describing updates to the respective page cache, such as write requests that modify data maintained in a page cache. Thus, in the event of a system or other failure that causes a loss of data in the page cache, log records in the write log 420 can be used to restore the page cache to a state prior to the failure. Log records may be stored sequentially according to the order in which updates are made to page cache, in some embodiments. By storing log records sequentially, log records may be replayed or re-applied in the order in which they are stored to generate a state of the page cache at a particular point in time. The storage nodes 410 can also implement respective input/output ("I/O") managers 440. The I/O managers 440 may handle I/O requests directed toward data volumes maintained at a particular storage node. Thus, an I/O manager 440b can process and handle a write request to a volume 414b at a particular storage node 410b, for example. An I/O manager 440 can be configured to process I/O requests according to block-based storage service application programming interface (API) and/or other communication protocol(s), such as such as the Internet small computer system interface (i SCSI) protocol. In some embodiments, I/O managers 440 implement respective log management components 442 and replication management components 430. The log management components can perform various log management functions, such as trimming log records and/or performing page cache recovery based, at least in part, on log records. The replication management components can perform various tasks, as discussed herein, related to volume replication.

A block-based storage service can manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 412a, a storage node 410a may serve as a master storage node. A master storage node may, in various embodiments, receive and process requests (e.g., I/O requests) from clients of the data volume. Thus, storage node 410a may then coordinate replication of the I/O requests, such as write requests, or any other changes or modifications to the data volume 412a to one or more other storage nodes serving as slave storage nodes. For instance, a storage node 410c may maintain a data volume 416d which is a replica of another data volume 412a. Thus, when a write request is received for the data volume 412a at the master storage node 410a, the master storage node 410a can be configured to forward the write request to the slave storage node 410c and wait until the slave storage node 410c acknowledges the write request as complete before completing the write request at the storage node 410. Master storage nodes may direct other operations for data volumes, like snapshot operations or other I/O operations (e.g., serving a read request). It should be noted that, in some embodiments, the role of master and slave storage nodes may be assigned per data volume. For example, for a data volume 412a maintained at a first storage node 410a, that first storage node 410a may serve as a master storage node. While for another data volume, such as data volume 412b, maintained at storage node 410a, the storage node 410a may serve as a slave storage node.

In some embodiments, data volumes are replicated with two copies. A replication protocol can be used that can make both copies of a volume deterministically consistent, and that is agnostic to features on the server that use replication for durability like snapshots. This can greatly simplify the replication protocol itself since there can be fewer custom messages, and can allow various other distributed features to be built on a server using replication without ever having to touch the replication protocol.

In various embodiments, data storage volumes can be presented as block devices to customers, addressable via read/write requests using an offset, length, and data. As mentioned, the data volume can be stored on a server as a type of persistent key-value store. In some embodiments, the storage on a server can be divided into portions, such as a log partition and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server. It at least some embodiments the writes first go to the log and then can later be written to the data partition.

A note for a customer write operation can contain information such as the offset for the write, the length, the operation number, and the data itself. The volume can map this to a key, value, data-reference store using an appropriate schema. One such schema includes a volume key, which can be a prefix to distinguish customer data, customer offset, and operation number. The schema can also include a volume value, which can refer to the data length, and a volume data reference, which can be a pointer to the location of the data. The volume storage engine can also support flushing of the data from the log to the appropriate data partition. Notes for customer writes include the data, such that all incoming writes can be written to the log. To free up space in the log, the storage server can periodically read the data reference and the associated data, write that data to the data partition, and replace the data reference with a pointer to a location on the data partition instead of the log. This enables that data to be removed from the log. This flushing can be performed done asynchronously, enabling multiple customer writes to be merged together.

As mentioned, in many instances it will be desirable to replicate various data volumes. A replication process can be responsible for ensuring that both copies of the volume are the same and that all changes are applied in the same order on each copy. The replication techniques discussed herein track these updates as operations. The operations can include, for example, customer writes and metadata updates such as volume provisioned input/output operations per second (IOPS), volume leases, and snapshot metadata. Each operation in at least some embodiments will have an ever-increasing operation number assigned, and the volume can be uniquely described by the sequence of operations. The replication process can guarantee that both copies have the same sequence of operations and will be executed in the same order.

Figure 5:
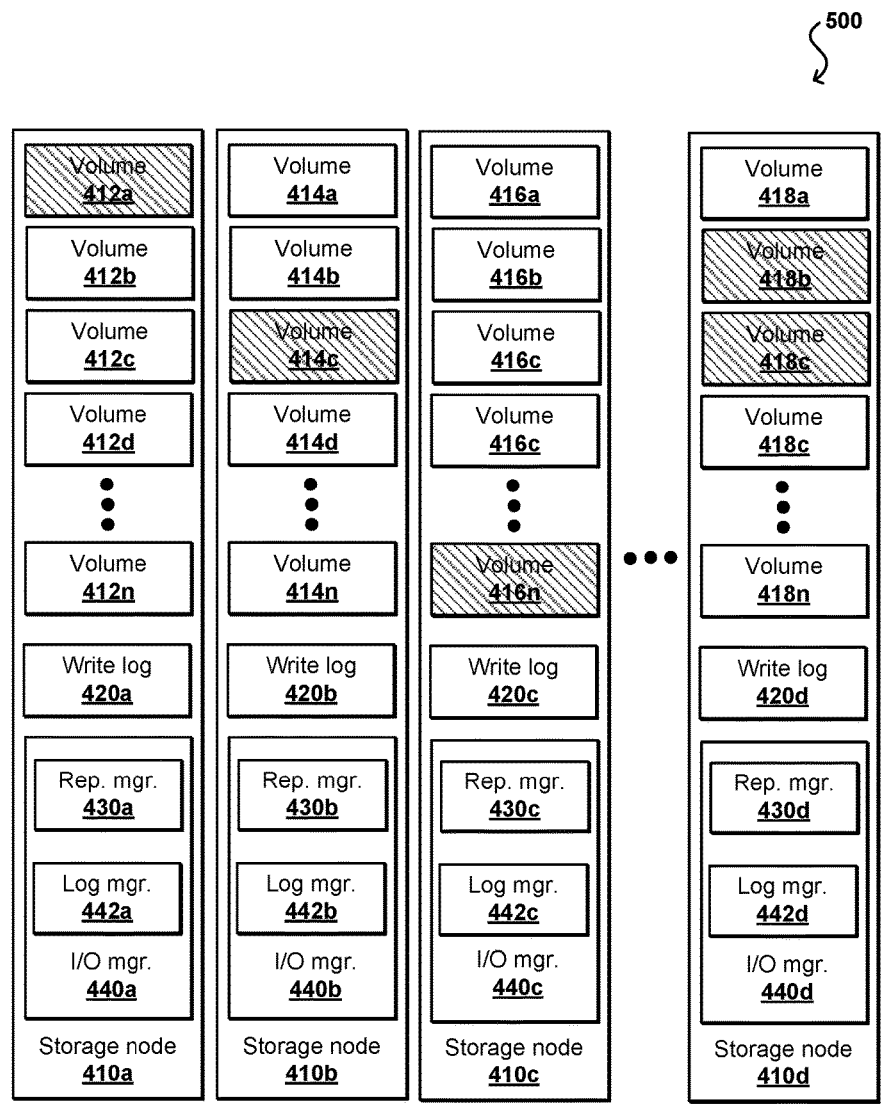
FIG. 5 illustrates a set of storage nodes where some of the volumes hosted by those nodes are not attached or connected to an active virtual machine instance that can be utilized in accordance with various embodiments.

FIG. 5 illustrates another view 500 of a set of storage nodes 500 that can be utilized in accordance with various embodiments. In this example, there are a number of data volumes that are not attached to servers (or other such components) in the resource provider environment, and thus are currently unable to serve I/O for those servers. These volumes 412a, 414c, 416n, 418b, 418c are represented by the patterned boxes in the figure. As mentioned, these volumes could potentially be re-attached to a server such that they could serve I/O, and thus count against the available capacity on the various nodes. In this example, the nodes are all connected (persistently) to a network locality with shared state and interconnect, such that these detached volumes are taking up capacity that could more advantageously be allocated to data volumes attached to servers of the network locality, which could improve performance and reduce cost. Thus, it can be desirable in at least some embodiments to move these detached data volumes, or at least one of a replicated data volume pair, to a different location in the resource provider environment. As mentioned, this can include another network locality that has available capacity and/or less demand, or to a separate storage service or facility, among other such options. In at least some embodiments a resource localization algorithm can be used that attempts to maximize the number of connected components that are contained within the same network locality, such as by determining requirements and connections and moving components between localities as appropriate.

Figure 6A:
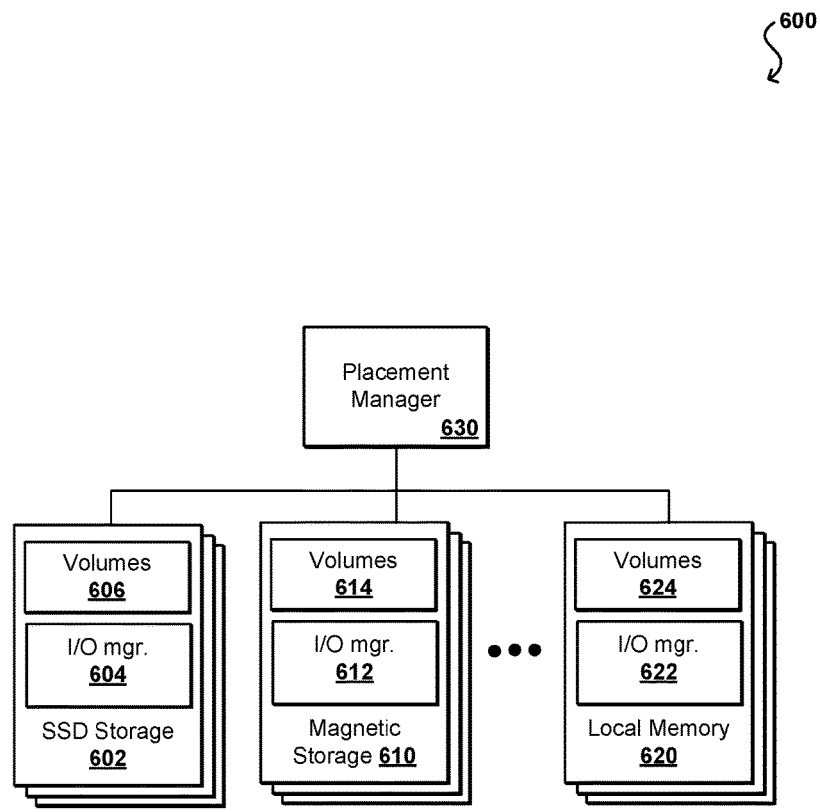
FIGS. 6A and 6B illustrates various configurations of tiers onto which volumes, or portions thereof, can be placed that can be utilized in accordance with various embodiments.

As mentioned, in many conventional systems a data volume for a customer will be placed on a specific storage tier, where that storage tier is specified for use by, for example, volumes of a particular type. FIG. 6A illustrates an example sub-system 600 wherein a placement manager 630 can determine to place data volumes 606, 614, 624 on hardware tiers corresponding to types of storage such as solid state drive (SSD) storage 602, magnetic storage 610, or local memory 620 (e.g., RAM or cache on a PCI device), among other such options. In at least some embodiments, a PCI device can include a trusted co-processor that is able to observe information about a host system without a processor of the host system being able to modify or gain access to the functionality of the PCI device. The PCI device can be programmable and function as a computer logically owned by an entity other than a provider of the host machine in at least some embodiments. Examples of SSD storage include flash memory-based solid state drives, PCIe-based SSDs, and enterprise flash drives (EFDs). Examples of magnetic storage include hard disk drives (HDDs), magnetic tape drives, magneto-optical drives, and domain propagation memory. Other types such as optical storage can be used as well. These types of storage devices also can be optimized for specific parameters, such as throughput, bandwidth, IOPS, and the like, which may work better for different applications such as media streaming or data archiving, among others. A placement manager 630, or other such system or service, can determine the type of volume to be created, can look up the type of hardware to be used for that volume, and can cause the volume to be created or provisioned on the corresponding hardware type. Each volume type can serve all reads and writes using a single class of hardware, and that hardware type does not change over the lifetime of the corresponding volumes.

In some embodiments, a customer might be able to specify the type of storage device to be used for a particular volume. For example, a customer might be able to request that SSD or magnetic hardware be used based at least in part on the respective performance of each type of hardware. In many cases, however, a customer may not understand the actual way in which that customer data is, or will be, used. For example, a customer might select a storage type that is optimized for throughput, but the actual usage could have been satisfied using a different storage type that would have provided sufficient throughput but more capacity in another area that is currently degrading the performance of that storage volume.

Figure 6B:
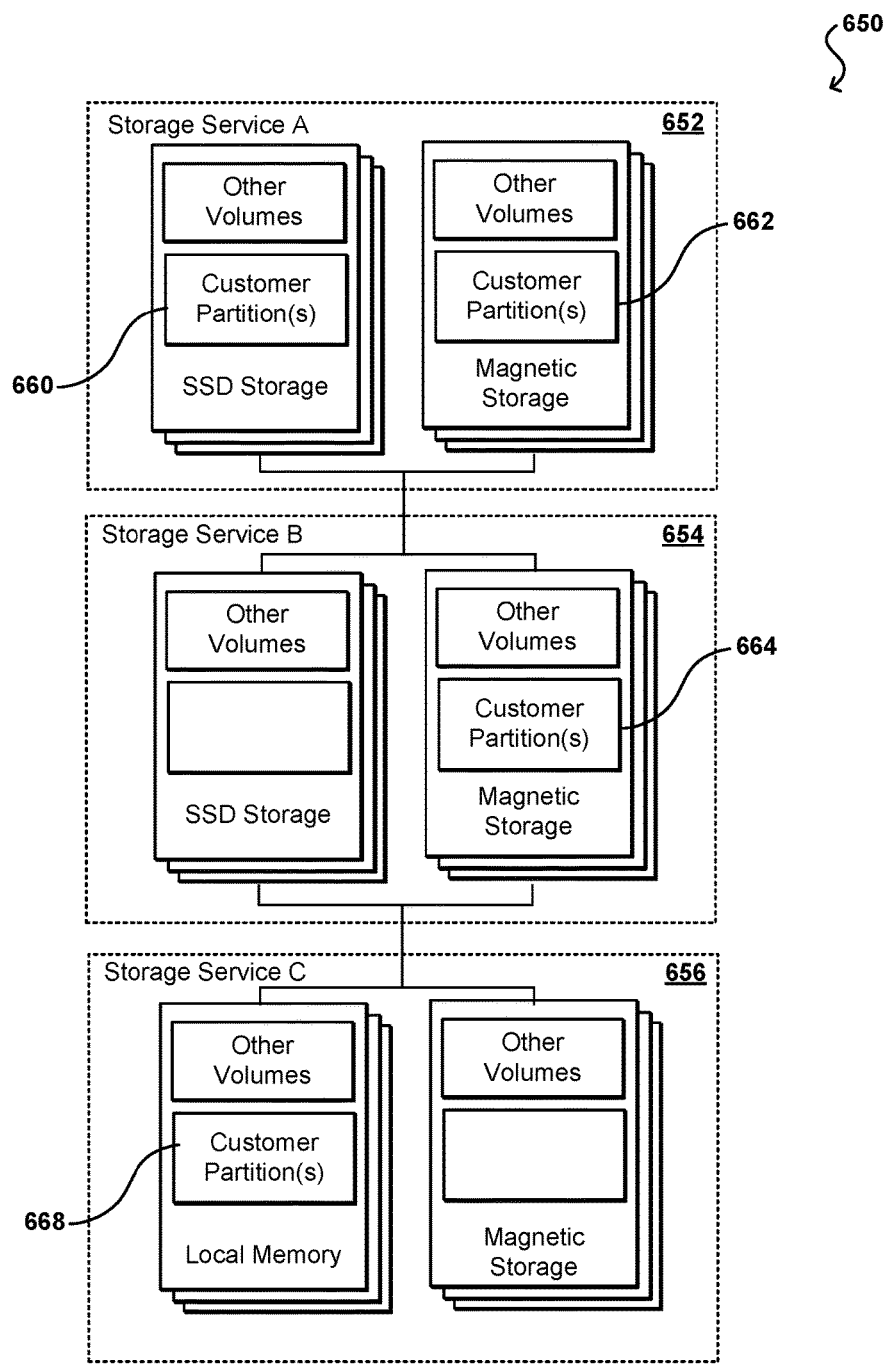

FIG. 6B illustrates another example subsystem 650 that can be used to store a data volume in accordance with various embodiments. In this example, the available storage tiers include both "horizontal" and "vertical" tiers as discussed elsewhere herein. The "horizontal" tiers can correspond to storage of different hardware types and/or optimizations. These can include, for example, magnetic storage, optical storage, SSD storage, removable storage, storage in memory on a PCI card or other limited sub-system or trusted co-processor, and in-memory storage, among others. There can also be different storage tiers among a single hardware type, such as magnetic storage tier optimized for streaming data and a magnetic storage tier optimized for cold storage, or data that is infrequently accessed. The storage tiers can also include "vertical" tiers, where each tier can correspond to a different storage system or service. For example, a first tier might correspond to a block storage service which another service might correspond to a general cloud storage service, among other such options. The different storage systems in the vertical storage tiers can may have different networking architectures or other characteristics beyond storage hardware that make them better suited for particular storage usage patterns in at least some embodiments. There can be other types or designations of tiers as well, with each tier having specific performance and cost values that can be used to determine the optimal tier to store at least a portion of a data volume.

In the example subsystem 650 of FIG. 6B, portions of a customer data volume are distributed across various storage tiers. As mentioned, this distribution can be selected based upon factors such as cost and performance, as well as user preferences and other such information. In this example, the storage tiers include a set of three different storage services, service A 652, service B 654, and service C 656. Within each storage service, there can also be different storage tiers, or sub-tiers, as well. For example, Storage Service A 652 includes both SSD and magnetic storage, while Storage Service C 656 includes both magnetic storage and local memory storage (e.g., RAM or cache memory) options, although example services might only have one type of storage in various embodiments. An entire volume might be placed onto any of these storage tiers, or portions might be stored across multiple tiers. In this example, a first partition 660 of a customer volume is stored to magnetic storage of a first storage service 652, a second partition 662 stored to magnetic storage of that service, a third partition 664 stored to magnetic storage of a second service 654, and a fourth partition stored to local memory of a third storage service 668. Each of these can be classified as different storage tiers due to the cost and performance characteristics, as well as the location and configuration, etc. It should be understood, however, that in some cases a customer volume might be distributed only across different hardware types within a single service, or across services but on the same hardware type, among other such options. The partitions can then be migrated as appropriate across the various storage tiers as discussed herein.

Accordingly, approaches in accordance with various embodiments can make decisions on the storage tiers to use for all or portions of a customer volume based upon the actual usage by the customer. This can include the initial placement, as well as subsequent placement (or migration) during use of the volume. Various factors can be used in making such a placement decision, as may include the frequency of access, the type of write pattern (i.e., random or sequential), the differences between read and write patterns, and the current or anticipated queue depth, among other such factors. For initial placement a placement manager 630 can look at data for other volumes provisioned for that particular customer, or similar customers, while for subsequent or "active" placements or relocations after placement the placement manager can look to the usage data, or I/O pattern, for that particular data volume. In at least some embodiments, a placement manager can profile the workload for a customer, or customer volume, and dynamically determine the appropriate hardware type.

In some embodiments, a new "hybrid" volume type can be offered to customers, where the volume can be stored to different storage tiers, at different times or concurrently, over the lifetime of the volume. The use of a hybrid volume can enable the initial placement to be on a determined storage tier in some embodiments, although in other embodiments the initial placement might still correspond to the type of volume or another static criterion, and the volume can be moved to a different storage tier after a usage pattern or type of workload has been sufficiently determined, etc. The I/O pattern and other such information for the volume can be monitored, and if it is determined that the volume would more optimally be hosted on a different storage tier according to various criteria, such as performance thresholds and/or cost, then at least a portion of the volume can be moved to a different storage tier. As the usage changes, or other relevant variations are detected, portions of the volume can be moved to different storage tiers at different points throughout the lifetime of the volume. The various criteria can be set, and the time periods for analysis and/or changes set, such that small variations do not cause the volume to be moved too frequently, as there is some overhead to moving the volume and other potential risks to frequent movement. It some embodiments a minimum time interval is specified between volume moves, as may include an hour, day, week, etc.

In some embodiments, the placement and/or movement decisions can be made for specific portions of a volume. For example, analysis of the usage might indicate that portions of the volume might benefit from different types of storage optimized for different usages. For example, a customer might optimally use a first type of storage for new data written to storage, and a different type for older data. In another example, certain partitions of a volume might be used for streaming data and other portions for non-streaming data, etc. In some embodiments a split might be used in order to provide the best performance possible while meeting cost constraints, where the amount of optimal storage will be used up to a cost cap for the customer, with a remaining portion being stored on a more cost effective type of storage. In some embodiments, a customer's usage pattern might change such that new writes are written to a different type of storage than was used to store the previously-written data. Various other reasons for splitting a volume across different types of hardware can apply as well as discussed and suggested elsewhere herein. In another example of placing different sections of the logical address space onto different hardware based on access patterns, a volume could be split internally such that the operating system (OS) pages are backed by SSD optimized for high IOPS, the media files are backed by SSD that is not optimized for IOPS. Pages that contain log files might be backed by magnetic storage and optimized for streaming, sequential workloads. Such an approach would improve the customer experience with respect to using just one of those volume types because the customer is paying for higher performance only where it makes a difference.

Given the ability to place and/or migrate volumes, or portions of volumes, to different tiers of storage, a number of different approaches can be taken within the scope of the various embodiments. For example, an initial placement decision may be relatively conservative, giving a customer plenty of resources to ensure performance while enabling the system to learn the actual patterns and/or requirements for the workload. This can include, for example, always initially placing volumes on a specified storage tier that may be optimized for a specific type of performance. Once it is determined with a reasonable amount of confidence that the volume would perform better using a different storage tier, at least a portion of the volume can be migrated to that type of hardware. In some embodiments a placement module or other such system or service can asynchronously analyze a customer workload and move at least a portion of the customer's volume onto a more appropriate tier and/or provision the volume a different amount of hardware resources or one or more tiers The module can also push new segmentation configuration data to the storage environment, whereby the storage environment can access different parts of the same volume on different tier without having to go through a management component of a management environment.

In some embodiments a smart client can execute in the data storage environment, for example, and can determine and/or recognize a fleet of servers that can service relevant I/O requests. When a portion of a workload is received, that client can send the workload to storage of the most appropriate tier based at least in part upon the understanding of the workload and/or client associated with the workload. In some embodiments a single server can function as the arbiter for all volume traffic, delegating to the correct hardware as appropriate.

Various other placement decisions can be made as well within the scope of the various embodiments. These can include, for example, placing master and slave volumes on different storage tiers in order to introduce different read and write behaviors. For example, writes can go to both the master and slave while reads might go only to the master, and each copy of the volume can be placed on an appropriate storage tier optimized for that usage. Similarly, "cold" data (i.e., data that has not been accessed for at least a determined period of time or is accessed less than a minimum frequency threshold) may advantageously be moved to a different storage tier that might provide for cheaper and/or more reliable storage but may not offer a high rate of IOPS or throughput. In still other embodiments, a single fast copy of some redundant data can be stored between volumes on different storage tiers, among other such options.

Such processes enable a provider to expose a more abstracted notion of volumes to customers. Some customers may have to be open to a little less certainty about how their data will be stored, for example, but providers can give a more flexible guarantee about performance for the customers, and ensure that the performance is in line with how the data volume is actually being used so the customer, or users associated with the customer, obtain the most benefit of the data volume. Instead of a customer's volume being placed on a specific storage tier with specific performance criteria or capability, which may or may not be optimal for the volume, all or portions of the volume can be placed and/or migrated to different storage tiers over time in order to enable the performance to be optimal for the usage or workload observed, determined, or predicted for that particular data volume. Usage information can include factors such as frequency of access, type of access, patterns of access, and the like.

In some embodiments suggestions will be made to the customer regarding tiers of storage that might be more optimal for a particular workload based on observed behavior and other such information. The customer can then determine whether or not to migrate a portion or all of the data volume. In other embodiments, the system may automatically place or migrate portions of a data volume in order to meet or improve performance, lower cost, or satisfy another such criterion. In some embodiments a customer may approve certain migrations or data types for automatic performance, while other migrations or data types may be blacklisted or may require customer approval, among other such options. In some embodiments the determination involves a periodic sweep of the relevant fleet of storage devices in order to determine available capacity, types of capacity available, and how those types are optimized. By tracking the usage and determining any usage patterns present, the workload can be classified as a type of workload appropriate for certain types of volumes and/or certain types of hardware. At least a portion of the volume can then be migrated as appropriate, such as by re-mirroring the customer's volume onto the storage tier that is determined to be most appropriate for their volume based upon the type of workload and other such information. In such a system, a customer does not have to make the decision as to the storage tier(s) to be used, which may not be optimal for their volume(s). A customer can instead purchase a flexible storage volume, and the system can analyze customer behavior to determine the optimal type of storage and data volume, for example, and bill the customer appropriately for that storage. In some embodiments a customer might be able to request the optimal performance available for a determined cost, and the placement decisions can be made accordingly.

In one example, a customer might indicate a maximum charge of $50 per month for a new volume. Each new customer volume might be created as a specific type of volume, which might have a fairly low number of IOPS, or other such performance metric, because that is all that is afforded under the provided cost allocation. The subsequent I/O read and write pattern on that volume can be monitored, and it can be determined that the customer generally has a sequential write pattern because the customer is using the volume for tasks such as streaming video or log processing. The system could then predict, with reasonable certainty, that provisioning this volume on a streaming hardware type, such as a magnetic server or streaming server, would enable the data volume to remain under the cost boundary while providing improved performance since that hardware type is optimized for that type of usage pattern. The system could migrate at least a portion of the volume to SSD optimized for higher IOPS, for example. Another example might migrate the data volume to a cheaper type of storage in order to provide greater bandwidth or IOPS, etc.

In at least some embodiments, one or more thresholds or criteria must be met or satisfied before a portion (or entirety) of a data volume is migrated. For example, there may be a minimum confidence threshold for the determination that the performance would likely be improved for the customer data volume. Based on the usage patterns, types of workloads, and other such determinations, there can be a determination of improvement for moving all or a portion of a data volume for each of a set of different types of storage, each with an associated confidence value based upon factors such as the amount of data, deviation from an access pattern over time, etc. In at least some embodiments the confidence needed to migrate at least a portion of a volume might be higher than the confidence needed to initially place or provision the volume, due to the cost of the migration and other such factors. Further, there might be a minimum amount of improvement needed before at least a portion of a data volume can be migrated to a different type of hardware. For example, an expected improvement in latency or throughput might have to at meet a minimum improvement threshold or other such metric. There can also be one or more cost criteria, such as a maximum overall amount or a maximum cost per unit of improvement, etc.

Various embodiments can also allow for some amount of seasonality in customer usage. Seasonality, as used herein, refers to different behavior at different times. This can include, for example, a change in usage for an electronic retailer around a holiday season or a change in usage for a company with an annual period of closure, among other such periodic variations. For example, a customer might write primarily sequentially in some weeks and primarily randomly in other weeks. For such variation, the migration may be allowed due in part to the length of time between changes, the duration of each change, and the overall improvement in performance that would be experienced. If the variation was hourly, however, these variations may not warrant individual optimization and the higher level pattern might be analyzed to make a placement or migration decision. A determination can be made as to whether a change would be appropriate for long enough, and provide sufficient benefit, to justify the cost of the migration.

Decisions in accordance with various embodiments can also consider capacity constraints for volume placement or migration. For example, a data plane or provider environment might have a significant amount of unused streaming hardware. The cost of streaming storage in that environment then might be relatively low in order to attempt to have capacity move to the unused storage, particularly where the moved data does not require storage by a different storage tier. Placements can then be weighted towards this unused capacity as a cost savings to both the customer and the provider, and the lower cost can enable additional throughput, bandwidth, IOPS, or other such resources to be provided for the customer volume that can at least make up for the change in storage type. In some embodiments, performance gained by the additional resources would still have to at least meet the minimum performance improvement criteria.

Decisions for placement and migration can be based upon observed behavior in some embodiments and expected behavior in others. For example, some embodiments might monitor usage patterns and make placement decisions based on the observed behavior for a data volume. In other embodiments, the usage patterns, customer historical data, and other such information can be used to attempt to predict usage over a future period of time and based the appropriate type of hardware upon the predicted usage. Some embodiments might utilize a weighted combination of both observed and predicted usage, where the respective weightings can be learned empirically or through computer learning, among other such options.

In one embodiment, the I/O requests for a data volume can be tracked for a volume or window of time. The access pattern can be analyzed to attempt to determine "hot" and "cold" bits of the logical address space, or portions of a data volume that have significant access load and insignificant access load, respectively. The hottest portions can be sent to in-memory storage or fast servers, such as SSD servers, while the colder portions can be sent to magnetic storage, among other such options. There might be some threshold determined, such as the hottest 20% going to SSD storage, where that threshold can be determined overall, per customer, per volume, based on the access pattern, etc. There thus can be a specified set of potential implementations for a volume, and components in the data environment can determine which implementation to utilize for a particular volume.

The information gathered regarding access patterns, workload types, and data center capacity can also be used to determine how to best add capacity to a data center. For example, if the volumes are being increasingly placed on SSD hardware, then it might be an indication that additional SSD capacity should be provided. The cost of such usage should be analyzed, however, to determine if other types should be added in order to move data volumes to the other types of storage that do not need SSD storage, in order to improve performance of the various volumes while freeing up SSD capacity. As mentioned, in some embodiments the system can attempt to self-balance into the available storage, as well as to favor certain hardware types in capacity strained and other such situations.

Another advantage to splitting volumes by partition or chunk is that common data chunks can be shared between volumes. For example, a chunk might store a boot machine image or other object that is commonly accessed by multiple sources. In the case of customer boots, for example, there might be ten volumes storing boot machine images spread across a fleet of servers. One or each of these servers storing a copy can be designated as an authoritative owner of certain parts of the logical address space for each customer that will share that object. This shared object that is frequently read by many sources then can be placed on fast hardware in order to serve the demand while being able to concurrently save significant storage capacity. Such an approach can also potentially provide a customer with a faster boot experience, or similar benefits, at no additional cost to the customer.

In at least some embodiments the customer may notice an improvement over an initial learning and optimization period. For example, a customer might initially be placed on a type of storage and have a type of volume allocated that provides an 80% optimal experience in terms of performance such as latency and throughput. Over an initial adjustment period, which might be twelve hours in some instances but in others might vary based upon the amount of time needed to obtain optimal performance, the performance would increase until optimal (or near optimal) performance is reached, at least within the cost and other constraints placed on the volume. If the customer significantly changes the access pattern for the volume, the performance might decrease for some initial period and then increase again as the volume is optimized for the new pattern. As mentioned, in some embodiments improvements based on placement might have a minimum period between migrations, such as an hour, twelve hours, or a day, such that other optimizations might be used as appropriate until a volume migration (full or partial) can be considered). In some instances the optimizations may take longer, such as where a customer indicates a certain pattern of usage but the actual usage is substantially different. Such as where a customer indicates that they want high throughput but the usage of their volume actually requires high bandwidth, so it may take some time to learn the behavior and make a significant change to the placement and/or configuration of the volume.

Further, different chunks of a data volume might have significantly different usage patterns. For example, one chunk might have frequent access while another chunk might have very infrequent access, and the types of access might be very different as well. In such instances the different chunks of a data volume can be migrated to different storage tiers as well. Certain embodiments allow for sub-chunk migrations as well, although in various embodiments the size of the chunks can be adjusted as needed to provide for optimization without significantly increasing management complexity. In some embodiments the chunk size for a customer can be updated to correspond to the detected usage pattern as well.

Approaches in accordance with various embodiments can attempt to predict at least the near-term usage of each volume as well as determining the currently physical utilization of each data volume. By predicting the usage, the customer volumes can be placed (or migrated) more intelligently in order to reduce the risk that the server will run out of physical capacity. In at least some embodiments, a "risk-based" placement model can be used that attempts to determine the risk that a server will soon be constrained with respect to bytes, throughput, or IOPS, for example, instead of simply relying upon which servers have the resources to accept specific volumes. The ability to provision customer volumes in such a way can be related to the effectiveness of the prediction model and the tolerance for the risk, among other such factors. In one embodiment, the predictive model can base the prediction on a variety of factors as may include, for example, customer identifier, whether the volume is a master volume or a slave volume, the type of volume (magnetic, GP2, provisioned IOPS volume, etc.), whether the volume is a boot volume or a data volume, whether or not the data volume is attached, the type of attachment, the current utilization of the resource, and the current age of the resource. The model could then produce a set of outputs with predictions for future usage, although a single prediction could also be used in various embodiments. The set of outputs in one example include a predicted utilization in one hour from the current time, six or twelve hours from the current time, one day from the current time, and three days or a week from the current time, although various other time periods can be utilized as well.

A service such as a placement manager can be configured to contact the various data servers, or host computing devices, to obtain up-to-date information about the partitions on each server and the capacity for each, both used and sold. This can occur at regular intervals in some embodiments, such as every five minutes in some embodiments. The placement manager can cause this information to be stored for each such scan or sweep, where the information can take the form of one record per partition to indicate sold and used bytes. A statistical analysis process (on the placement manager or otherwise) can consume that data for the past block of time, such as by pulling all the five-minute data from the past week and using that as an input to a model generation process. A model can then be created that can predict future byte utilization from the input set and expose that predicted utilization data in a consumable format. As mentioned, in some embodiments the inputs can include features such as volume type, volume purpose, whether the volume is from snapshot, the sold bytes, the sold IOPS, the current used bytes, and the current age, and the outputs of the model can include the predicted used bytes in an hour, six hours, a day, and three days from the current time. The models themselves can be exposed in various ways. For example, a rigid model structure (i.e., a linear regression) can be used and then the parameters uploaded, while in other examples a service generating the model could expose an API to evaluate the model or preemptively evaluate the model for all partitions and post the raw prediction data, among other such options. The prediction data can then be used for both initial placement decisions as well as decisions about moving or migrating the placements, among other such decisions before or after a data volume or other such resource is provisioned.

Features such as volume age can be useful, as statistics show that volumes of a certain age typically do not grow beyond a certain rate, which can help predict growth of a particular volume. On the other hand, relatively new volumes might be the most likely to grow rapidly. By modeling the growth with volume age, a more accurate prediction can be made. This can be built up on a per-customer, customer type, account type, or other such basis. In a basic approach, a new volume might be initially allocated all the capacity that was purchased, as risk of insufficient capacity could be the highest, and then once a volume reaches a certain age the volume could be assigned a fixed growth percentage (e.g., 5%) over one or more periods of time. In at least some embodiments the growth percentage value can be relatively conservative, particularly for customers or applications without a substantial amount of data for analysis. For customers where there is a lot of data about volume growth, a more accurate prediction can be made based upon the information for other customer volumes, etc. Similarly, if a volume is detached, or otherwise not able to receive I/O, a much lower growth rate can be applied that can also be based at least in part upon the amount of time the volume has been detached. If the volume becomes reattached, a higher growth rate can be applied.

Another feature of use is whether or not the data volume was created from a snapshot. A volume being created from a snapshot provides some guidance as the size of the volume, as least as far as a lower bound. For example, if a 100 GB snapshot is used to create a data volume that currently has about 10 GB of data, there is a reasonable assumption that the server will continue pulling bytes and eventually get to at least 100 GB. Having information about the size of the snapshot as well as the current size of the data volume can thus provide information about the expected growth rate of the volume. Further, volumes created from snapshot tend to be largely read only, so once the volume reaches the expected size it can be reasonable to assume a very low growth rate going forward.

Other features can be valuable in predicting volume growth as well. For example, the type of virtual machine to which the data volume is attached can be a reliable indicator of the anticipated rate of growth. Certain virtual machine types will be more likely to write at high volumes, while certain virtual machine types might have very little I/O at all. Certain other types might write in bursts with very little I/O in-between. These can be good indicators of the amount of growth that can be anticipated for the respective data volumes at various times. In some embodiments the type of volume itself can also be a good indicator of growth, as some types of volumes may be more appropriate for high I/O usage while other types might be more appropriate for volumes that are not expected to change much over time. Further, in some embodiments a customer, application, or other source can cause a tag (e.g., key value pair or metadata) to be applied to a data volume that provides some indication of the expected usage. For data volumes that have been in use for a while, information about the volume and/or patterns of I/O access can also provide information about the anticipated growth of the volume. Trends in I/O can also be utilized in addition to recent amount of I/O, in order to make more accurate predictions in cases where the rate of I/O is significantly increasing or decreasing. Limits on IOPS or other such features can also be included in the predictions, where there is some type of limit bounding the potential growth.

In at least some embodiments, the utilization can be analyzed on a per-partition basis for each sweep of the server utilization data. A determination can be made as to the size of each partition and/or data volume, as well as how much customers are using that physical space. Based on the model features and the utilization data, an expected utilization can be calculated for the various time periods output by the model. In at least some embodiments, the data can be stored for subsequent analysis as well as to refine the model(s) used. In some embodiments the utilization and/or growth rate can be determined based upon whether the volume is a master volume or a slave volume, as reads may not go to some slave volumes, which can affect the I/O received by that volume. So if there is an allocation for the master it can safely be assumed that the I/O for the slave will be less than that allocation. Further, if it is determined that the master volume receives primarily read requests, then the allocation for the slave may be able to be significantly reduced in proportion with the percentage of reads to the master. As mentioned, volume type can be an important feature as well. Certain volume types might be longer lasting and have slower growth rates, while other volume types might only exist for a short duration but have significant use during that duration, or at least a determined portion of that duration. Analysis can be done to determine bounds and/or average growth rate for different volume types. Various limits on utilization can also be considered, as a maximum IOPS allocation can limit the amount of growth of a data volume by a corresponding amount. Many of the features above can also be used to predict bandwidth and IOPS for a particular data volume, as well as other such features as discussed and suggested elsewhere herein.

An important feature, which might be weighted most heavily in at least some embodiments, is the historical growth rate of a customer's volumes, particularly where those volumes are allocated for a specific application or purpose. In some embodiments initial growth rates may be set based at least in part upon a categorization or classification of the associated user, such as whether the user is a fast user or a slow user based upon applying thresholds to previously determined growth rates for that customer. While new volumes can be allocated based upon features such as previous volumes, snapshot size, and determined general bounds that are relatively conservative, volumes with more data can have more dynamic allocation determinations based upon behavior and other such features discussed and suggested elsewhere herein. While the various features can be analyzed independently in some embodiments, various combinations of features can be analyzed using a linear regression model, machine learning algorithm, decision tree algorithm, or other such process to analyze the relative impact of each feature and determine the appropriate weighting of each feature for use in determining the predicted growth rate or allocation.

As mentioned, values such as the predicted utilization and/or growth rate can be used to determine where to place specific volumes in order to ensure that sufficient capacity is available while not taking an unrealistic risk with respect to resource overutilization. Similarly, the growth rate and utilization values can be used to determine when various volumes should be moved to other resources, such as other data servers, in order to ensure sufficient capacity and availability. For example, a threshold amount of capacity may be required on a particular resource in order to minimize the risk that an oversell will affect availability for customer volumes. Accordingly, when a resource is approaching such a threshold based on the partitions or volumes on that resource, one or more of the volumes can be migrated to a different resource or location. The volume(s) selected for migration can depend upon features such as size and growth rate, but can also depend at least in part upon the type of volume or other such features, as a slave volume might have less potential impact during migration than a master volume, and a mature volume with little traffic might preferably be moved over a new volume that is receiving a lot of requests. Various other features can be used for a migration determination as well as discussed and suggested elsewhere herein. Further, in at least some embodiments the volumes can be migrated as the overall predicted growth rate for the volumes on a resource increases, as it can be desirable to limit the growth rate and size to an amount that is less than the bandwidth or capability of moving volumes to another location.

In at least some embodiments an automated process can be utilized that continually, or at least periodically, rebuilds the model from actual data for the volumes. This can include, for example, analyzing the last month of customer growth data and building or refining the predictive model using that data. New model files can be generated and used for the predictions with the most recent data. The models can be used by a placement manager as discussed herein. In some embodiments there may be at least two different placement managers, including one for initial placement and one for migration. In some embodiments the modeling component may be a separate system, component, or service as well.

Figure 7:
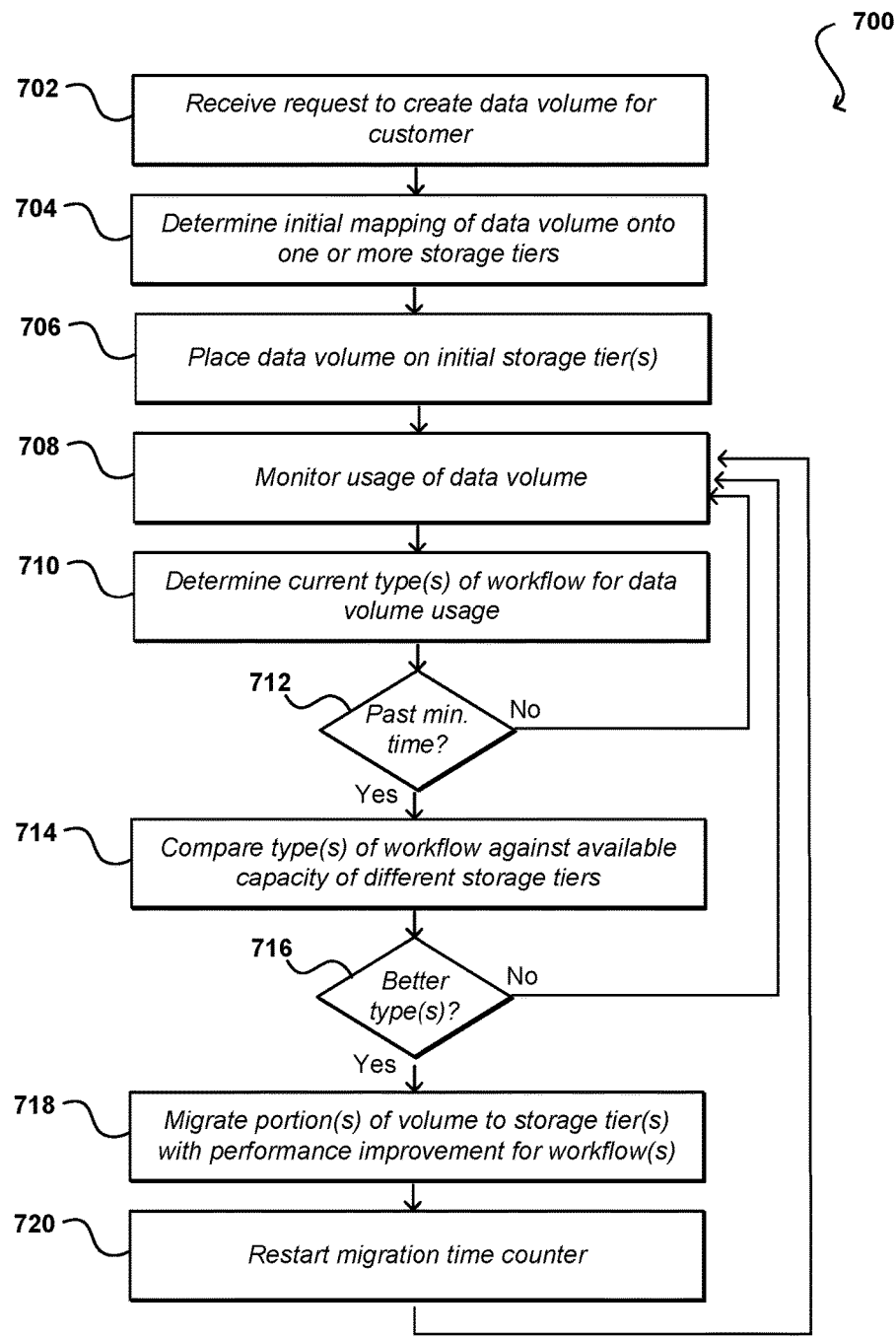
FIG. 7 illustrates an example process for migrating at least a portion of a data volume to a different storage tier that can be utilized in accordance with various embodiments.

As mentioned, various predictions can be used for both placement and migration of data volumes, partitions, and other such resource allocations within the scope of the various embodiments. FIG. 7 illustrates one example process 700 that can be used to determine appropriate placements based upon such predictions that can be utilized in accordance with various embodiments. In this example, a request to create a data volume for a customer is received 702, whether from the customer, a data manager, an application, or another such source. In this example, the customer is an entity that has an account with a provider of the data storage hardware and related components offered through use of a multi-tenant resource provider environment. A determination can be made 704, before or after receiving the request, as to an initial mapping of the customer data volume onto one or more storage tiers. For example, certain systems might always initially place a storage volume on a particular storage tier with particular optimizations. In other systems the customer (or a related entity) can specify an initial storage tier, or the initial storage tier(s) may be selected based at least in part upon information associated with the request, such as volume type, cost constraints, and the like. The data volume can then be placed 706 on the storage tier(s), along with any appropriate optimizations or other configurations discussed or suggested elsewhere herein.

Once the data volume is placed and configured, the data volume can be enabled to receive and process customer I/O requests. The usage of the data volume can be monitored 708 to attempt to detect patterns, trends, or other aspects of the usage. Based at least in part upon this data, a current type of workflow for the data volume usage can be determined 710. The types of workflow can include, for example, streaming workflows, fast writes, read only, high infrequent access, and other such types. As mentioned, in at least some embodiments a minimum amount of time must pass before a migration can occur after a previous migration or placement. This can be a fixed period of time or can depend upon factors such as the amount of improvement available, needs of the system, type of customer volume, etc. If it is determined 712 that an insufficient amount of time has passed since the last placement or migration, the current configuration can remain in place and the monitoring can continue. If a sufficient amount of time has passed, such as more than a minimum time threshold, then the current type of workflow determined for the volume can be compared 714 against the available capacity of different storage types. This can include, for example, determining types of storage with sufficient available (or sellable) capacity and determining an appropriateness or expected performance for each of those types for the current type of workflow. In some embodiments each storage tier may be classified as optimal for a certain type of workflow, or might have rankings or scores for various types of workflows, and the determinations of appropriate storage tiers can be based at least in part upon selecting the storage tier determined, from the available tiers, to be optimal for the current type of workload. If it is determined that the current storage tier storing the volume is optimal, or that there are no other tiers that would provide the necessary improvement in performance, then the data volume can remain on the current storage tier and the monitoring can continue. If, however, it is determined 716 that there is a better, or more optimal, storage tier for the current type of workflow, then one or more portions of the data volume can be migrated 718 to the storage tier with the highest expected, or optimal, performance for the relevant portion of the determined type of workflow. When the migration occurs, or is completed, the migration time counter can be restarted 720 such that another migration cannot occur for that data volume for at least the minimum amount of time discussed above. The monitoring of usage of the data volume on the new storage tier can occur, and additional changes made over time as appropriate.

Figure 8:
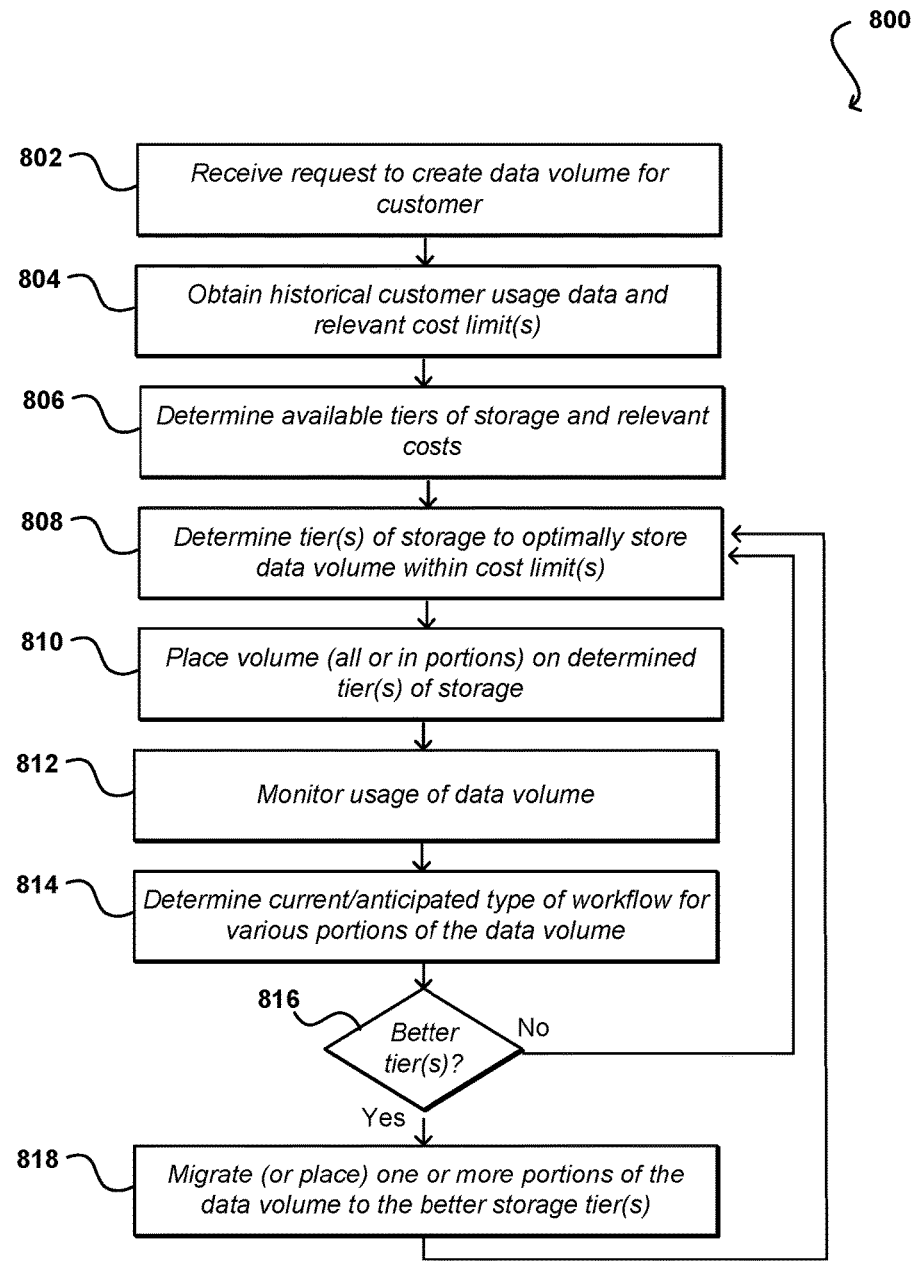
FIG. 8 illustrates an example process for placing and/or migrating portions of a data volume that can be utilized in accordance with various embodiments.

FIG. 8 illustrates an example process 800 for placing and migrating data volumes, or portions thereof, that can be utilized in accordance with various embodiments. In this example, a request to create a data volume on behalf of a customer is received 802, as may be received from any of the sources referenced in the previously discussed process. In this example, however, an attempt will be made to determine the appropriate storage tier for the customer volume based at least in part upon past usage and workload data available for the customer, or similar customers. Any available historical customer usage data (or other useful data) can be obtained 804, as well as any relevant cost limits or criteria. For example, a customer might specify that the customer is only willing to spend up to $50/month for hosting the data volume. In another example, a customer might specify a range of pricing but request to optimize certain performance aspects (IOPS, throughput, etc.) to the extent possible, or might specify certain rates for certain levels of performance, among other such options. Concurrently in some embodiments, the storage tiers that have available capacity for the volume can be determined 806, along with relevant pricing for various uses, configurations, and optimizations for that capacity. The past usage can be analyzed to determine likely usage patterns or types of workloads for the new data volume, and a determination can be made 808 as to the storage tier(s) to use to optimally host the data volume within the cost limits, or satisfying any relevant cost criteria. This can include, for example, analyzing various combinations of storage tiers for various chunks or partitions of the data volume, and determining the anticipated performance and cost for each. In at least some embodiments, the combination that generates the best performance (according to one or more performance criteria) within the cost constraints can be selected for the data volume. In at least some embodiments the customer might instead want to lower the cost to the extent possible while maintaining various minimum performance values. Various other such approaches can be utilized as well within the scope of the various embodiments. One the appropriate selection and/or combination of resources is determined, the portion(s) or entirety of the data volume can be placed 810 accordingly. As mentioned elsewhere herein, the amount of capacity allocated can depend upon the current and anticipated load on the resources as well in some embodiments.

Once the data volume is placed and configured, the data volume can be enabled to receive and process customer I/O requests. The usage of the data volume can be monitored 812, including monitoring of the individual partitions and/or chunks in some embodiments, to attempt to detect patterns, trends, or other aspects of the usage. Based at least in part upon this data, at least one current and/or anticipated type of workflow for the data volume usage can be determined 814. The types of workflow vary by partition or chunk, for example, and can various workflow types as discussed elsewhere herein. As mentioned, in at least some embodiments a minimum amount of time must pass before a migration can occur after a previous migration or placement. For the current and/or anticipated types of workloads, those types can be compared against the available capacity of different storage tiers. This can include, for example, determining storage tiers with sufficient available (or sellable) capacity and determining an appropriateness or expected performance for each of those tiers for the current type of workflow. If it is determined that the current storage tier storing the volume is optimal, or that there are no other tiers that would provide the necessary improvement in performance, then the data volume, and any corresponding chunks or partitions, can remain on the current storage tier and the monitoring can continue. If, however, it is determined 816 that there is at least one better, or more optimal, storage tier for at least one of the determined types of workflow, then the data volume (or at least the relevant portion(s), partition(s), or chunk(s)) can be migrated 818 to the respective storage tier(s). The monitoring of usage of the data volume on the new tiers(s) of hardware can occur, and additional changes made over time as appropriate.

Figure 9:
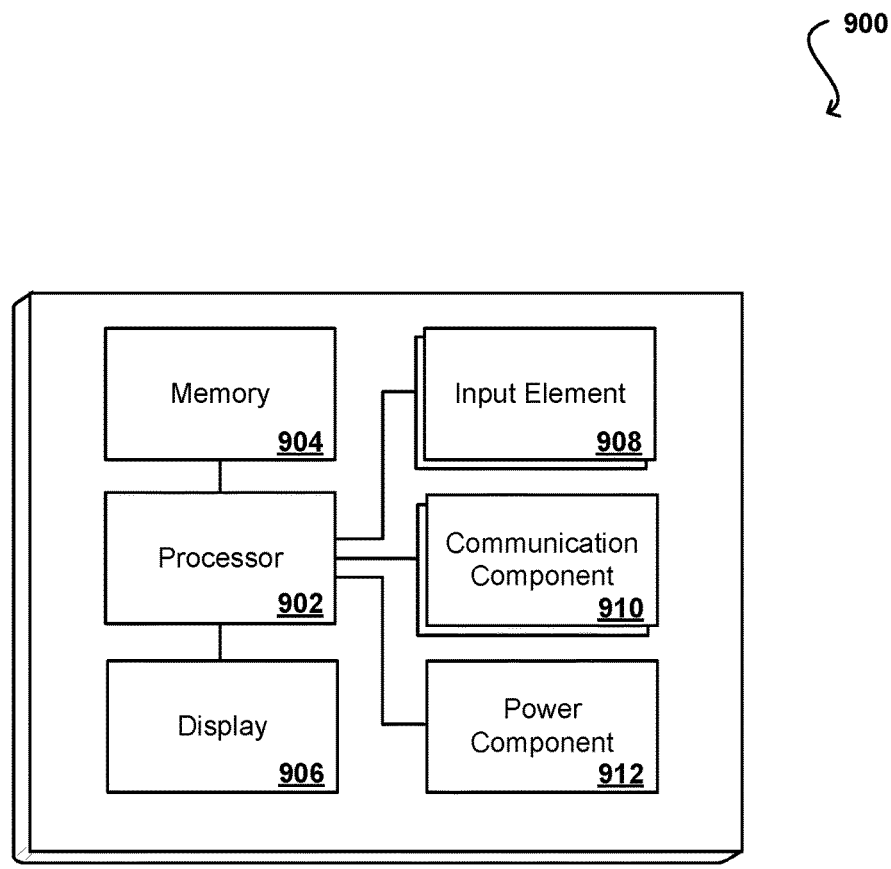
FIG. 9 illustrates components of an example computing device that can be used to perform aspects of the various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface or communication elements or components 910 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 912, such as power cords, power ports, batteries, wirelessly powered or rechargeable receivers, and the like.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, at a placement manager of a resource provider environment, a request for a data volume to be created, the data volume associated with a customer having an account with a provider of the resource provider environment;

determining, based at least in part upon workload data for the customer and a type of the data volume, at least one storage tier to be used to host at least a portion of the data volume, the resource provider environment including resources of two or more storage tiers having different performance, each of the storage tiers capable of storing at least a portion of the data volume;

placing at least a portion of the data volume on at least a first selected resource of a first storage tier in the resource provider environment based at least in part upon a determination that the at least a portion of the data volume is associated with a sequential access workload;

placing other remaining portions of the data volume on at least a second selected resource of at least a second storage tier based at least upon a determination that the other remaining portions of the data volume are associated with a non-sequential access workload; and placing the at least a portion of the data volume on at least a third selected resource of a third storage tier based at least in part upon a determination that the at least a portion of the data volume is associated with a random access workload.

2. The computer-implemented method of claim 1, further comprising:
analyzing usage data over a period, the usage data indicating a change in a pattern of access for the customer volume;
determining that the third storage tier is associated with improved performance, the improved performance satisfying a minimum performance improvement criterion; and
migrating at least a portion of the data volume to the at least a third selected resource of the third storage tier.

3. The computer-implemented method of claim 1, further comprising:
determining an amount of time having passed since placing the at least a portion of the data volume to at least the first selected resource; and
determining that the amount of time meets a minimum time criteria before placing the at least a portion of the data volume on the at least a third selected resource.

4. The computer-implemented method of claim 1, wherein the portions of the data volume include chunks or partitions of a customer data volume.

5. A computer-implemented method, comprising:
determining to create a data volume on behalf of a customer;
determining first usage data for the data volume for a first time period;
determining a first storage tier to be used to host at least a first portion of the data volume based at least upon a determination that the first usage data indicates that the first portion of the data volume is associated with a sequential access pattern, wherein the first storage tier is optimized for sequential access patterns;
placing the first portions of the data volume on at least a first resource of at least the first storage tier;
placing a second portions of the data volume on at least a second resource of at least a second storage tier based at least upon a determination that the first usage data indicates that the second portion of the data volume is associated with a random access pattern;
determining second usage data for the data volume at a second time period; and
placing the first portion of the data volume on at least a third resource of at least the second storage tier based at least upon a determination that the second usage data indicates that the first portion of the data is associated with a random access pattern.

6. The computer-implemented method of claim 5, further comprising:
placing the second portion on the second storage tier based further in part upon at least one of an available capacity of the second storage tier, a cost of the second storage tier, a cost limit for the customer, a preference of the customer, a set of performance characteristics of the second storage tier, or durability information for the second storage tier.

7. The computer-implemented method of claim 5, further comprising:
determining that a minimum amount of time has passed since the placement of the first portion of the data volume on the first resource before the placement of the first portion of the data volume on the third resource.

8. The computer-implemented method of claim 5, further comprising:
determining, for the resources of the first storage tier, predicted capacity over at least one future period of time; and
determining the first storage tier used to host the first portion further based at least in part upon comparing a predicted utilization and growth rate data for the data volume to the predicted capacity for at least a subset of the set of resources, the resource predicted to have sufficient capacity to support the predicted utilization and growth rate data for the data volume over at least the future period of time.

9. The computer-implemented method of claim 5, further comprising:
determining the first storage tier based at least in part upon at least one of an initial selection criteria, a type of the data volume, historical customer workload data, customer selection, or workload data for similar types of data volumes.

10. The computer-implemented method of claim 5, wherein at least one of the first storage tier or the second storage tier corresponds to in-memory storage, a limited subsystem with local memory, object storage, block storage, or archival storage.

11. The computer-implemented method of claim 5, further comprising:
selecting the first storage tier and the second storage tier based at least in part upon a type of the data volume, the first storage tier being a different type of storage tier from the second storage tier.

12. The computer-implemented method of claim 5, further comprising:
determining that a forecast improvement in performance for the data volume at least satisfies a minimum criterion before migrating at least a portion of the data volume to a third storage tier.

13. The computer-implemented method of claim 5, wherein a hardware type of the first storage tier includes at least magnetic storage, optical storage, memory, or solid state storage.

14. The computer-implemented method of claim 5, further comprising:

determining a second hardware type for the data volume based at least in part upon a combination of observed workload and expected workload for the data volume.

15. A system, comprising:

at least one processor; and memory including instructions that, upon being executed by the at least one processor, cause the system to:

determine to create a data volume to be associated with a customer;

analyze usage data of the data volume over a first period of time;

determine at least a first storage tier to be used to host a first portion of the data volume based on the first usage data indicating a sequential access pattern for the first portion;

place the first portion of the data volume on at least a first resource of the first storage tier configured for a sequential access pattern, with a second portion of the data volume being placed on at least a second resource of at least a second storage tier;

analyze usage data of the data volume over a second period of time to determine a type of workload for the customer volume, the usage data indicating at least one of a sequential access pattern, a random access pattern, or an average queue depth;

determine that a third storage tier is associated with the type of workload for the customer volume; and migrate the first portion of the data volume to the third storage tier configured for a random access pattern based on the second usage data indicating a random access pattern for the first portion.

16. The system of claim 15, wherein
the usage data includes a frequency of access.

17. The system of claim 15, wherein the instructions when executed further cause the system to:

determine that a minimum amount of time has passed since placement of the first portion of the data volume on at least the first resource before migrating the first portion of the data volume to the third storage tier.

18. The system of claim 15, wherein the instructions when executed further cause the system to:

periodically determine at least one current type of workload for the customer volume; and migrate one or more portions of the data volume to resources of different storage tiers based at least in part upon the at least one current type of workload.

* * * * *